Nov. 2, 1965  T. EVANS  3,215,259

AUGER WITH RECIPROCATING FINGER ELEMENTS

Filed March 2, 1964

INVENTOR.
THOMAS EVANS.
BY Emerson B Donnell ATTY
Robert O. Godard AGT

United States Patent Office 3,215,259
Patented Nov. 2, 1965

3,215,259
AUGER WITH RECIPROCATING
FINGER ELEMENTS
Thomas Evans, Bettendorf, Iowa, assignor to J. I. Case Company, Racine, Wis., a corporation of Wisconsin
Filed Mar. 2, 1964, Ser. No. 348,411
17 Claims. (Cl. 198—211)

The present invention relates to agricultural implements and particularly to mechanism for feeding cut grain to threshing mechanism, especially in combines, and an object is to generally improve devices of this type.

A variety of combine has become popular which has a long auger trough across the front, in which is an auger having a right-hand flight on one end, and a left-hand flight on the other, so supported in the trough as to impel the cut grain or straw toward the middle of the auger, where there is an outlet in the trough leading to the threshing mechanism. At this point, the grain is impelled underneath the auger, and into the outlet by suitable means as a series of retracting fingers which are substituted for the flights in this part of the auger, being the portion in front of the outlet to the threshing mechanism. Such fingers have been used extensively, but have left something to be desired, and it is accordingly the principal object of the invention to improve the construction, operation and durability of these fingers, and particularly to furnish an improved scotch yoke construction for actuating the fingers, and guiding means for the yoke construction, which guiding means it as least in part, independent of the fingers.

The means used and the manner of attainment of these objects is fully set forth in the following specification and accompanying drawings in which.

Figure 1:
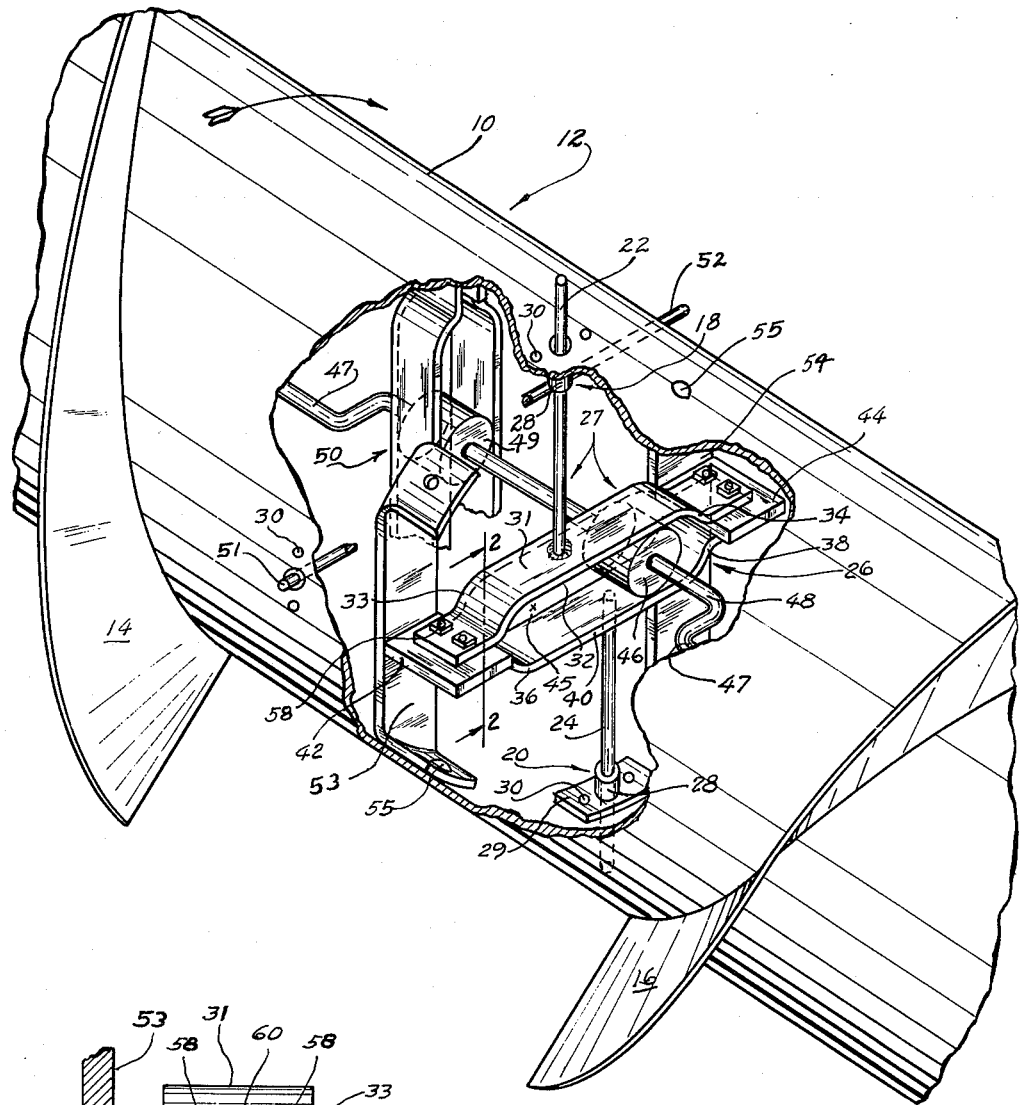
FIG. 1 is a fragmentary perspective view of the mid portion of a feed auger of the type concerned, with parts removed and others broken away.

As seen in FIG. 1, the device is contained in a tubular portion 10 of an auger generally designated as 12, which is equipped with right-hand flighting 14 and left-hand flighting 16, the structure being installed in an auger trough not shown, but of the general type disclosed in the patent to Carrol, 2,696,290, Dec. 7, 1954.

As usual, the left-hand flighting is disposed on the right side of the machine, as related to the direction of travel, and the right-hand flighting is disposed on the left-hand side of the machine.

The crop material is cut along the front edge of the trough and impelled toward the center by the flights 14 and 16, where it passes beneath the tube 10 as will appear.

Tube 10 has guiding or bearing means 18 and 20 in which are slidably guided fingers 22 and 24, which are rigidly mounted on, or fixed to a central member 26, preferably substantially at right angles to fingers 22 and 24, and constituting a finger unit generally designated as 27. Fingers 22 and 24 can be coaxial, or can be offset from each other as shown, within the contemplation of the invention, it being advisable for best working of the device that both fingers be parallel or substantially parallel to a diameter of the cylinder 10, both fingers being parallel to the same diameter. Fingers so disposed may slide in and out through bearings 18 and 20 in response to movements of central member 26, which latter is constrained to move in a path parallel to fingers 22 and 24, and parallel as aforesaid to a diameter of cylinder 10. Bearings 18 and 20, preferably each consist of a bushing 28 fixed to a flange 29 and secured to cylinder 10 by suitable means as bolts or rivets 30.

Central member 26 may vary in form, but preferably constitutes an example of a scotch yoke composed of an upper raceway 31, which may be formed by bending a strip of suitable material to form a flat central portion 32, and a pair of downwardly bent end portions 33 and 34. End portions 33 and 34 join with end portions 36 and 38 of a lower portion or raceway 40, but having interposed between them, or at least connected in the region of end portions 33 and 34 respectively, blocks, slippers or guide means 42 and 44, which may be of any suitable material, but are preferably of one of the newer hardened plastic materials or polyamides, or any such material, particularly characterized by an inherent lubricating or slippery quality, for a purpose to appear.

End portions 33 and 36, together with end portions 34 and 38 space flat central portions 32 and 40 to provide a slot 45 therebetween, in which is disposed a driving or actuating means 46 conveniently in the form of a roller journaled on a shaft 47 which is supported within tube 10 in a fixed position in any well-known manner; for example, as shown in the hereinbefore mentioned patent to Carrol, 2,696,290. Shaft 47 has an offset or "crank" portion 48, on which roller 46 is journaled so that roller 46 constitutes stationary means within the cylinder extending into the slot 45 formed between raceways 31 and 40. Any well-known means can be used to prevent axial shifting of roller 46. It will now be apparent that rotation of cylinder 10, while roller 46 is held stationary, will cause reciprocation of finger unit 27 relative to auger 12 and alternate extension and retraction of fingers 22 and 24.

Roller 46 is so positioned that it causes extension of the fingers 22 and 24 in proper phase relation to the rotations of auger 12, to feed the material as desired. Ordinarily, the fingers are extended in front of the tube 10 to engage the material and insure its being pressed down to pass beneath the auger. The fingers remain extended as they pass underneath the auger to impel the material backwardly under the auger, and then retract to disengage the material and avoid lifting it behind the auger to any appreciable extent—which otherwise might tend to start long material winding about the auger. The effect, or phasing of the reciprocatory movements can be determined by the position of roller 46 which may be adjusted in any well-known manner; as for example, that shown in the above-mentioned Carrol Patent 2,696,290. Thus, the fingers 22 and 24 may be caused to extend and retract earlier or later in the rotations of auger 12. Also, the amount of offset of crank portion 48 will determine the length of stroke or amount of movement of fingers 22 and 24, relative to tube 10.

It is to be understood that a plurality of rollers as 49 would be arranged end to end along crank portion 48 and a corresponding number of finger members as 50 would be located side by side to cooperate with them. These finger members would have bearings similar to bearings 18 and 20, spaced axially of cylinder 10 and arranged in any desired pattern circumferentially about cylinder 10, so that crop material would be engaged by the fingers in a satisfactory or uniform manner for steady and even feeding across the width of the area between flighting 14 and 16. These several finger units except 50 have been removed in FIG. 1, to avoid undue complication of the drawing, but an additional finger 51 is shown projecting from the cylinder 10 to the left of finger member 27, and still another finger 52 is shown projecting from the front of the auger. These latter fingers are connected to their own individual central members, such as member 50 in the manner shown in connection with fingers 22 and 24.

Finger member 27 is guided by the engagement of fingers 22 and 24 with bearings 18 and 20 so that yoke member 26 must remain oriented about its own axis so as to properly engage roller 46, while also at, or substantially at a predetermined angle to fingers 22 and 24. As so far described, however, yoke 26 could swing about the axes of fingers 22 and 24, and thus get out of alignment with the roller 46. This is prevented by engagement of above-mentioned slippers or guides 42 and 44 with a pair of guide rails 53 and 54 which are fixed in tube 10 in the position of chords in a plane normal to the axis of tube 10. Rails 53 and 54 may be secured in place in any suitable manner, as by bolts or rivets 55. In the embodiment illustrated, rails 53 and 54 are made from strips of suitable material of rectangular cross section with the ends bent to fit against the interior of cylinder 10, but other shapes are contemplated as within the scope of the invention. Guides 42 and 44 each engage only one side of rails 53 and 54, it being impossible for one of slippers 42 and 44 to swing away from its respective rail, since to do so would press the other against its particular rail and which latter contact would prevent such swinging. Slippers 42 and 44 are preferably identical so that it is necessary to describe only one.

Figure 2:
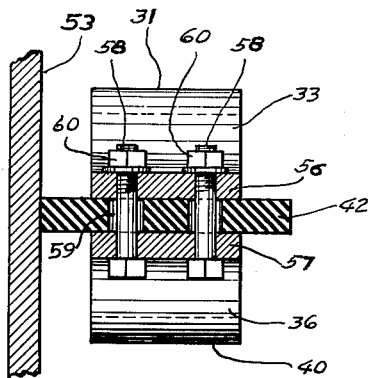
FIG. 2 is an enlarged detail of an adjustment means in section, substantially on the line 2—2 of FIG. 1.

Turning to FIG. 2, bent portions 33 and 36 approach each other on opposite sides of slipper 42 and terminate in tongue-like portions 56 and 57. Portions 56 and 57 are clamped in forcible contact with slipper 42 by means of bolts 58 which extend in the present instance through the tongue-like portions and through slipper 42, the latter being provided with slotted holes 59 through which the bolts extend. Bolts 58 have nuts 60 which are tightened to develop the clamping pressure and if slipper 42 does not make the desired lightly brushing contact with the rail 53, or if looseness develops after long use, nuts 60 may be loosened and slipper 42 shifted toward rail 53 so that the slack or looseness may be taken up after which the nuts 60 are again tightened. The same thing can be done on the other side so that yoke 26 will be held in its proper relation, or at right angles to the axis of roller 46. In this way, finger unit 27 is guided for free reciprocating movement relative to cylinder 10 and prevented from shifting out of a favorable position relative to its actuating mechanism or roller 46.

As will be apparent to one skilled in the art, such adjustment might equally well be provided by shifting chordal elements 53 and 54, or shifting the entire finger unit 27, and such arrangement is contemplated as within the invention.

It is thought that the operation of the device is clear from the foregoing description, it being apparent that the rotating tube 10 carries around with it the rails 53 and 54, together with the fingers 22, 24, 51 and 52, as well as yoke members 31 and 40. Since roller 46 reremains stationary the yoke and fingers are caused to reciprocate so that the fingers 22 and 24 are alternately projected from tube 10 and retracted at the proper time. A number of finger units, as stated, are intended to be used in close juxtaposition along crank portion 47 to provide a group of fingers to engage the usual large volume of crop material, and these fingers may be arranged in any desired pattern, as for example in a helical row corresponding to the path of flights 14 and 16 about tube 10, but any desired pattern or arrangement of fingers is considered as within the scope of the invention.

Guide rails 53 and 54 together with slippers 42 and 44 are of substantial importance in the successful performance of a device of this type. As the auger works in the grain, fingers 22, 24, 51, etc., engage the grain or cut straw quite forcibly, and, depending upon the position of the straws as they are encountered, a fairly strong rotating force is developed in the fingers, by reason of uneven wrapping of straw thereabout momentarily during the impelling part of the cycle. Whatever means is utilized to resist this turning effort must be quite rugged and dependable, and in the present structure the distance from any finger outwardly to the guide rails 53 and 54 is a fairly large proportion of the radius of the auger or tube 10. The lever arm through which the twisting force is applied to the guide rail is therefore quite long and, conversely, according to the laws of mechanics, the pressure against the guide rail is relatively light so that there is no excessive wear or strain on the mechanism by reason of the undesired turning effort exerted by the grain on fingers 22, 24, 51, etc.

Variations of the disclosed structure are contemplated and will doubtless occur to others skilled in the art, and it is to be understood that the invention is not to be taken as limited to the particular structure shown and described, or in fact in any manner except as defined in the claims.

What is claimed as new and desired to be secured by Letters Patent of the United States is:

1. A crop feeding mechanism for grain harvesting implements such as combines, said crop feeding mechanism comprising a rotatable hollow cylinder having a plurality of crop moving finger units arranged to rotate with such cylinder and to reciprocate within such cylinder, and each unit having a finger arranged substantially parallel to a diameter of such cylinder and projecting through the peripheral wall thereof to be extended and retracted by reciprocations of said finger unit, said unit including a yoke fixed in relation to said finger, transversely thereof, providing a slot normal to the axis of said cylinder, and stationary means within the cylinder engaging said slot at a point offset from the axis of said cylinder whereby to cause reciprocation of said yoke and finger relative to said cylinder, and guiding means for said yoke independent of said finger and positioned fixed on a wall of said cylinder to maintain said yoke in its relation with said slot normal to the axis of said cylinder.

2. A device according to claim 1 in which said guiding means is disposed at one end of said yoke.

3. A device according to claim 1 in which said guiding means is disposed at both ends of said yoke.

4. A crop feeding mechanism for grain harvesting implements such as combines, said crop feeding mechanism comprising a rotatable hollow cylinder having a plurality of crop moving finger units arranged to rotate with said cylinder and to reciprocate within said cylinder, and each unit having a pair of fingers arranged substantially parallel to a predetermined diameter of the cylinder and projecting through opposed openings in the peripheral wall of the cylinder to be extended and retracted by reciprocations of said finger unit, said unit including a yoke fixed in relation to said fingers, transversely thereof, providing a slot normal to the axis of said cylinder, and sationary means within the cylinder engaging said slot at a point offset from the axis of said cylinder whereby to cause reciprocation of said yoke and finger relative to said cylinder, and guiding means for said yoke independent of said fingers and positioned to maintain said yoke in its relation with said slot normal to the axis of said cylinder, said guiding means comprising a pair of spaced chordal elements fixed in said cylinder and providing guiding surfaces substantially parallel to said fingers adjacent the ends of the yoke, and a slipper fixed to each of said yoke in guiding engagement with one of said guiding surfaces.

5. A device according to claim 4 in which one guiding surface is positioned, on contact with its respective slipper, to tend to rotate said yoke about said fingers in one direction, while the other guiding surface is positioned, on contact with its respective slipper, to tend to rotate said yoke about said fingers in the other direction, and said device including means for adjusting one of said slippers toward and away from its respective guiding surface.

6. A crop feeding mechanism for grain harvesting implements such as combines, said crop feeding mechanism comprising
  a rotatable hollow cylinder having a plurality of crop moving finger units arranged to rotate with such cylinder and to reciprocation within such cylinder, and each unit having a finger arranged substantially parallel to a diameter of such cylinder and projecting through the peripheral wall thereof to be extended and retracted by reciprocations of said finger unit, said unit including a yoke fixed in relation to said finger, transversely thereof, providing a slot normal to the axis of said cylinder, and stationary means within the cylinder engaging said slot at a point offset from the axis at said cylinder whereby to cause reciprocation of said yoke and finger relative to said cylinder,
  guiding means for said yoke independent of said finger and positioned to maintain said yoke in its relation with said slot normal to the axis of said cylinder, said guiding means comprising
  a chordal guide element fixed in said cylinder parallel to said finger, adjacent one end of said yoke, and
  guiding means on said yoke engaged in guiding relation to said chordal guide element, the last mentioned guiding means being made of self-lubricating molded plastic material.

7. Crop feeding mechanism for grain harvesting implements such as combines, comprising
  a rotatable hollow cylinder having in its wall a plurality of generally opposed holes spaced axially of the cylinder;
  crop moving finger units, longer than the diameter of the cylinder, mounted within the cylinder, and each unit including two fingers extending transversely to the axis of the cylinder, slidable through corresponding holes in opposite sides of the cylinder, together with a central member within the cylinder to which the fingers are affixed substantially in axial alignment with each other, and each member containing an elongated slot, disposed at right angles to and extending transversely to the axis of the cylinder in opposite directions from the longitudinal axes of the fingers,
  stationary means within the cylinder extending into said elongated slots to cause said finger units to reciprocate relatively to said cylinder, during rotation of said cylinder, and
  means fixed to the wall of said cylinder in position to be engaged by a portion of said central member displaced from said fingers in a direction transversely of said cylinder to guide said central member in a path such that said slot remains substantially at right angles to the axis of said cylinder during the reciprocating movements of said central member.

8. Crop feeding mechanism for grain harvesting implements such as combines, comprising
  a rotatable hollow cylinder having in its wall a plurality of generally opposed holes spaced axially of the cylinder;
  crop moving finger units, longer than the diameter of the cylinder, mounted within the cylinder, and each unit including two fingers extending transversely to the axis of the cylinder, slidable through corresponding holes in opposite sides of the cylinder, together with a central member within the cylinder to which the fingers are affixed, and each member containing an elongated slot, disposed at right angles to and extending transversely to the axis of the cylinder in opposite directions from the longitudinal axes of the fingers,
  stationary means within the cylinder extending into said elongated slots to cause said finger units to reciprocate relatively to said cylinder, during rotation of said cylinder, and
  means fixed to the wall of said cylinder in position to be engaged by a portion of said central member displaced from said fingers in a direction transversely of said cylinder to guide said central member in a path such that said slot remains substantially at right angles to the axis of said cylinder during the reciprocating movements of said central member.

9. In a crop feeding mechanism for grain harvesting implements such as combines, of the type comprising
  a rotatable hollow cylinder having a plurality of crop moving fingers arranged to project and retract through suitable openings in the walls thereof,
  a plurality of finger units, each comprising a pair of fingers arranged substantially parallel to a diameter of said cylinder, and slidably engaged respectively in openings on generally opposite sides of said cylinder, each finger unit including a central member within the cylinder to which the fingers are affixed, disposed substantially at right angles to the axis of the cylinder, and extending in opposite directions from the fingers,
  stationary means within the cylinder in guiding engagement with said central member at a region offset from the axis of said cylinder, to cause said finger units to reciprocate relatively to said cylinder during rotation of said cylinder, and
  means fixed to the wall of said cylinder in guiding engagement with a portion of said central member, displaced from said fingers in a direction transverse to said cylinder to guide said central member in a path such that said central member remains substantially at right angles to the axis of said cylinder during the reciprocating movements of said central member.

10. In a crop feeding mechanism the combination with a rotatable hollow cylinder, of a plurality of finger units each comprising
  a finger arranged substantially parallel to a diameter of said cylinder, and a central yoke portion fixed transversely to the finger within the cylinder, substantially at right angles to the axis of the cylinder,
  stationary means within the cylinder engaged with the yoke in a region offset from the axis of the cylinder to cause said finger units to reciprocate relatively to said cylinder during rotation thereof,
  a guide rail fixed in said cylinder in the position of a chord of said cylinder in the region of an end of said yoke portion, and
  means on said yoke portion positioned in sliding engagement with said guide rail to guide said yoke portion in a path such that it remains substantially at right angles to the axis of said cylinder during the reciprocating movements of said finger units.

11. In a crop feeding mechanism the combination with a rotatable hollow cylinder, of a plurality of finger units each comprising
  a finger arranged substantially parallel to a diameter of said cylinder, and a central yoke portion fixed transversely to the finger within the cylinder, substantially at right angles to the axis of the cylinder,
  stationary means within the cylinder engaged with the yoke in a region offset from the axis of the cylinder to cause said finger units to reciprocate relatively to said cylinder during rotation thereof,
  spaced substantially parallel chord means fixed in said cylinder in a direction substantially parallel to the path of sliding movement of the fingers in the region of the ends of said yoke portion, and
  means on said yoke portion positioned in sliding engagement with said chord means to guide said yoke portion in a path such that it remains substantially at right angles to the axis of said cylinder during the reciprocating movements of said finger units.

12. In a crop feeding mechanism the combination with a rotatable hollow cylinder, of a plurality of finger units each comprising
  a plurality of opposed fingers arranged substantially parallel to a diameter of said cylinder, and a central yoke portion fixed transversely to the fingers within the cylinder, substantially at right angles to the axis of the cylinder, stationary means within the cylinder engaged with the yoke in a region offset from the axis of the cylinder to cause said finger units to reciprocate relatively to said cylinder during rotation thereof, spaced substantially parallel chord means fixed in said cylinder in a direction substantially parallel to the path of sliding movement of said fingers in the region of the ends of said yoke portion, and means on said yoke portion positioned in sliding engagement with said chord means to guide said yoke portion in a path such that it remains substantially at right angles to the axis of said cylinder during the reciprocating movements of said finger units.

13. In a crop feeding mechanism the combination with a rotatable hollow cylinder, of a plurality of finger units each comprising a finger arranged substantially parallel to a diameter of said cylinder, and a central yoke portion fixed transversely to the finger within the cylinder, substantially at right angles to the axis of the cylinder, stationary means within the cylinder engaged with the yoke in a region offset from the axis of the cylinder to cause said finger units to reciprocate relatively to said cylinder during rotation thereof, spaced substantially parallel guide rails fixed in said cylinder in the position of spaced parallel chords of said cylinder in the region of the ends of said yoke portion, and means on said yoke portion positioned in sliding engagement with said guide rails to guide said yoke portion in a path such that it remains substantially at right angles to the axis of said cylinder during the reciprocating movements of said finger units.

14. In a crop feeding mechanism the combination with a rotatable hollow cylinder, of a plurality of finger units each comprising a finger arranged substantially parallel to a diameter of said cylinder, and a central yoke portion fixed transversely to the finger within the cylinder, substantially at right angles to the axis of the cylinder, stationary means within the cylinder engaged with the yoke in a region offset from the axis of the cylinder to cause said finger units to reciprocate relatively to said cylinder during rotation thereof, a guide rail fixed in said cylinder in the position of a chord of said cylinder in the region of an end of said yoke portion, and guide means composed of a member of the family of polyamides, fixed on said yoke portion and poistioned in sliding engagement with said guide rail to guide said yoke portion in a path such that it remains substantially at right angles to the axis of said cylinder during the reciprocating movements of said finger units.

15. A crop feeding mechanism for grain harvesting implements such as combines, said crop feeding mechanism comprising a rotatable hollow cylinder having a plurality of crop moving finger units arranged to rotate with said cylinder and to reciprocate within said cylinder, and each unit having a pair of fingers arranged substantially parallel to a predetermined diameter of the cylinder and projecting through opposed openings in the peripheral wall of the cylinder to be extended and retracted by reciprocations of said finger unit, said unit including a yoke fixed in relation to said fingers, transversely thereof, providing a slot normal to the axis of said cylinder, and stationary means within the cylinder engaging said slot at a point offset from the axis of said cylinder whereby to cause reciprocation of said yoke and finger relative to said cylinder, and guiding means for said yoke independent of said fingers and positioned to maintain said yoke in its relation with said slot normal to the axis of said cylinder, said guiding means comprising a pair of spaced chordal elements fixed in said cylinder and providing guiding surfaces substantially parallel to said fingers adjacent the ends of said yoke, a slipper element fixed to each end of said yoke in guiding engagement with one of said guiding surfaces and said device providing means for adjusting said elements toward and away from each other to provide a suitable sliding contact therebetween.

16. A crop feeding mechanism for grain harvesting implements such as combines, said crop feeding mechanism comprising a rotatable hollow cylinder having a plurality of crop moving finger units arranged to rotate with such cylinder and to reciprocate within such cylinder, and each unit having a finger arranged substantially parallel to a diameter of such cylinder and projecting through the peripheral wall thereof to be extended and retracted by reciprocations of said finger unit, said unit including a yoke fixed in relation to said finger, transversely thereof, providing a slot normal to the axis of said cylinder, and stationary means within the cylinder engaging said slot at a point offset from the axis of said cylinder whereby to cause reciprocation of said yoke and finger relative to said cylinder, guiding means for said yoke independent of said finger and positioned to maintain said yoke in its relation with said slot normal to the axis of said cylinder, said guiding means comprising a chordal guide element fixed in said cylinder parallel to said finger, adjacent one end of said yoke, and guiding means on said yoke engaged in guiding relation to said chordal guide element.

17. A crop feeding mechanism for grain harvesting implements such as combines, said crop feeding mechanism comprising a rotatable hollow cylinder having a plurality of crop moving finger units arranged to rotate with such cylinder and to reciprocate within such cylinder, and each unit having a finger arranged substantially parallel to a diameter of such cylinder and projecting through the peripheral wall thereof to be extended and retracted by reciprocations of said finger unit, said unit including a yoke fixed in relation to said finger, transversely thereof, providing a slot normal to the axis of said cylinder, and stationary means within the cylinder engaging said slot at a point offset from the axis of said cylinder whereby to cause reciprocation of said yoke and finger relative to said cylinder, guiding means for said yoke independent of said finger and positioned to maintain said yoke in its relation with said slot normal to the axis of said cylinder, said guiding means comprising a chordal guide element fixed in said cylinder parallel to said finger, adjacent one end of said yoke, and a second guide element on said yoke engaged in guiding relation to said chordal guide element, one of said guide elements being made of self-lubricating molded plastic material.

References Cited by the Examiner

UNITED STATES PATENTS 2,748,921   6/56   White _____ 198—211

SAMUEL F. COLEMAN, *Primary Examiner.*

UNITED STATES PATENT OFFICE
CERTIFICATE OF CORRECTION

Patent No. 3,215,259

November 2, 1965

Thomas Evans

It is hereby certified that error appears in the above numbered patent requiring correction and that the said Letters Patent should read as corrected below.

Column 4, line 35, strike out "positioned"; column 5, line 6, for "reciprocation" read -- reciprocate --; line 15, for "at" read -- of --.

Signed and sealed this 28th day of June 1966.

(SEAL)
Attest:

ERNEST W. SWIDER
Attesting Officer

EDWARD J. BRENNER
Commissioner of Patents